(12) United States Patent
Ohya et al.

(10) Patent No.: US 6,392,868 B2
(45) Date of Patent: May 21, 2002

(54) ELECTRIC DOUBLE LAYER CAPACITOR (75) Inventors: Masako Ohya; Kazuya Mimura; Yutaka Nakazawa; Satoshi Abe; Satoshi Arai; Takashi Yasuda, all of Tokyo; Toshihisa Nagasawa, Toyama; Koji Sakata; Mitsuru Ogawa, both of Tokyo, all of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/792,056

(22) Filed: Feb. 26, 2001

(30) Foreign Application Priority Data

Feb. 28, 2000 (JP) .................................. 2000-050746

(51) Int. Cl.[7] ................................................. H01G 9/00
(52) U.S. Cl. ....................... 361/502; 361/512; 361/521; 361/517; 361/519; 29/25.03
(58) Field of Search ................................ 361/502, 512, 361/521, 503, 520, 530, 433, 517, 519; 29/25.03

(56) References Cited

U.S. PATENT DOCUMENTS

| 3,652,902 | A | * | 3/1972 | Hart et al. ................... 317/230 |
| 5,136,473 | A | * | 8/1992 | Tsuchiya et al. ............. 361/502 |
| 5,227,960 | A | * | 7/1993 | Kunishi et al. .............. 361/502 |
| 5,450,279 | A | * | 9/1995 | Yoshida et al. .............. 361/502 |
| 5,741,607 | A | * | 4/1998 | Gilmour ........................ 429/94 |
| 5,781,403 | A | * | 7/1998 | Aoki et al. ................... 361/502 |
| 5,959,830 | A | * | 9/1999 | Inagawa et al. ............. 361/502 |
| 5,973,912 | A | * | 10/1999 | Kibi et al. ................... 361/502 |
| 6,084,766 | A | * | 7/2000 | Jerabek et al. .............. 361/502 |
| 6,208,502 | B1 | * | 3/2001 | Hudis et al. ................. 361/503 |

FOREIGN PATENT DOCUMENTS

| JP | 55-107225 | | 8/1980 |
| JP | 5-299295 | | 11/1993 |
| JP | 8-83596 | | 3/1996 |
| JP | 409063894 A | * | 3/1997 |
| JP | 11-135382 | | 5/1999 |

* cited by examiner

Primary Examiner—Dean A. Reichard
Assistant Examiner—Nguyen T Ha
(74) Attorney, Agent, or Firm—McGinn & Gibb, PLLC

(57) ABSTRACT

An electric double-layer capacitor has a pair of thrust plates for thrusting a stacked cell pair and a gasket for encapsulating the stacked cell pair together with the thrust plates. The thrust plate has slanted side surfaces for effecting a close contact with a packaging overcoat. The thrust plates and the mounting gasket are coupled together by an interdigitaion relationship.

23 Claims, 9 Drawing Sheets

ELECTRIC DOUBLE LAYER CAPACITOR

BACKGROUND OF THE INVENTION (a) Field of the Invention

The present invention relates to an electric double layer capacitor (EDLC) and, more particularly, to the structure of the thrust plates and the mounting gasket of the EDLC having higher characteristics and a larger capacitance with smaller dimensions.

(b) Description of the Related Art

The EDLCs have been used in a variety of applications, and now are expected for new applications such as a power source for driving a cell motor of a car in combination with a lead battery, and an auxiliary power source in combination with a solar battery. The EDLC is now being developed to have a larger storage capacity with smaller dimensions by taking advantage of the structure of the EDLC having a small thickness.

Figure 1A:
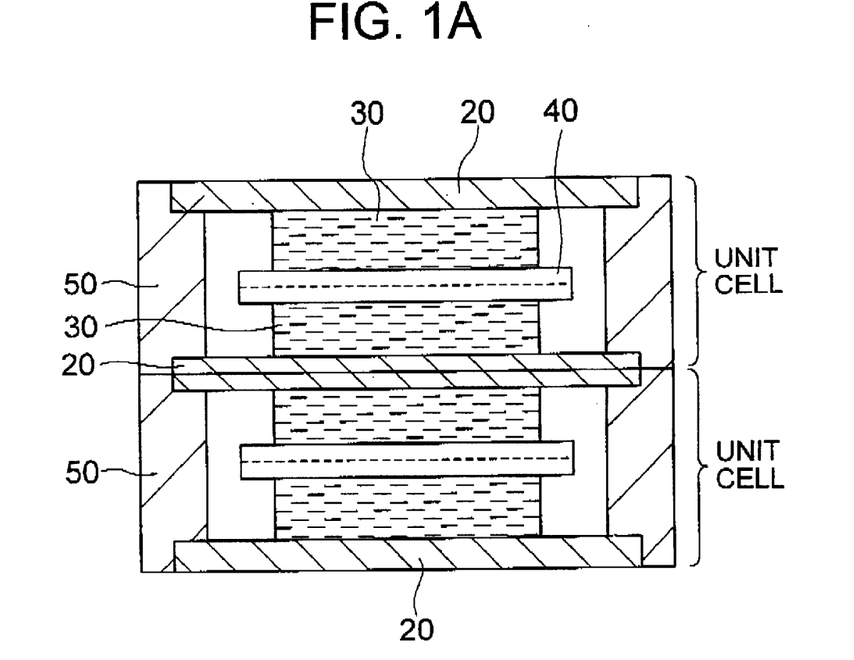
FIGS. 1A and 1B are sectional views of conventional EDLCs.
Figure 1B:
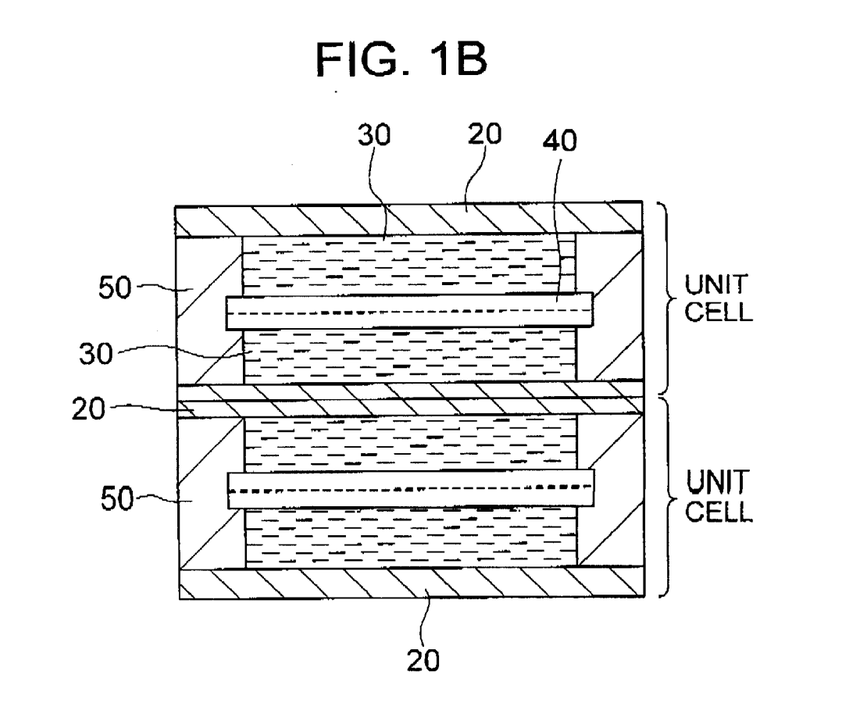

FIGS. 1A and 1B show conventional EDLCs in cross section. The EDLC includes a plurality of unit capacitors or unit cells stacked one on another and each including a pair of polarizing electrodes 30, a porous separator 40, a pair of current collectors 20 made of conductive sheet, and a gasket 50. Each unit cell is supported by a cylindrical mounting gasket 50 for encircling the polarizing electrodes 30, which sandwich therebetween the porous separator 40 and is sandwiched between the pair of current collectors 20. The current collectors 20 disposed outermost side of the stacked unit cells are in electric contact with a pair of metallic terminals (not shown) each having an external lead terminal.

The polarizing electrodes 30 are impregnated with an electrolytic solution which may be an aqueous or organic solution, and sealed by an packaging overcoat not shown in the drawings.

The withstand voltage of the EDLC is generally limited by the electrolysis voltage of the electrolytic solution, and thus a specified number of unit cells are stacked for serial connection depending on the desired withstand voltage, with one of the current collectors of the unit cell being shared with the adjacent unit cell, or in contact with one of the current collectors of the adjacent unit cell.

Patent Publications JP-A-55-107225, -5-299295, -8-83596 and -11-135382 describe EDLCs having a lower internal resistance and excellent resistance against mechanical impacts. In these EDLCs, each unit cell having a pair of carbon electrodes impregnated with electrolytic solution and sandwiching therebetween a porous separator is encapsulated by a laminated packaging overcoat made of organic polymers having a metallic film as a core member under a vacuum ambient.

Patent Publication JP-A-5-299295 describes a EDLC wherein a unit cell is formed by thrusting the capacitor elements received in an envelope between a pair of thrust plates, followed by screwing the same.

For the EDLCs, it is proposed or suggested in a variety of publications such as mentioned above to reduce the contact resistance in the unit cell as well as stacked unit cells, in view of the trend for obtaining a higher storage capacity with smaller dimension.

In the proposed EDLC, wherein the contact resistance is reduced by using the pair of thrust plates, for example, there is a problem in that it is difficult to achieve a uniform close contact in fact for reducing the contact resistance. In addition, the stacked unit cells are likely to be misaligned at the interface therebetween during the thrusting operation under the vacuum ambient.

Thus, in the conventional EDLC, there occur damages such as split, distortion, or ununiform contact of the electrode layers, and damage or crack of the package. In short, desired equivalent serial resistance (ESR) characteristics or stability thereof as well as desired reliability of the product are not achieved in the conventional EDLC.

SUMMARY OF THE INVENTION

In view of the above problems in the conventional EDLCs, it is an object of the present invention to provide a structure for the EDLC which is capable of allowing smaller dimensions and having a larger storage capacity, and reducing and stabilizing the ESR etc. characteristics of the EDLC.

The present invention provides, in one aspect thereof, an electric double-layer capacitor (EDLC) including: a cell assembly including at least one unit cell having a pair of polarizing electrodes impregnated with electrolytic solution, and a porous separator sandwiched between the polarizing electrodes, a pair of current collectors sandwiching therebetween the unit cell, and a pair of lead terminals in electric contact with the current collectors; a pair of thrust plates each disposed on a corresponding one of the current collector for thrusting therebetween the cell assembly, a mounting gasket for receiving the cell assembly together with the thrust plates; and a packaging overcoat for encapsulating the cell assembly, thrust plates and the mounting gasket, each of the thrust plates having a slanted side surface in contact with the packaging overcoat.

The present invention provide, in another aspect thereof, an electric double-layer capacitor (EDLC) comprising: a cell assembly including at least one unit cell having a pair of polarizing electrodes impregnated with electrolytic solution, and a porous separator sandwiched between the polarizing electrodes, a pair of current collectors sandwiching therebetween the unit cell, and a pair of lead terminals in electric contact with the current collectors; a pair of thrust plates each disposed on a corresponding one of the current collector for thrusting therebetween the cell assembly, a mounting gasket for receiving the cell assembly together with the thrust plates; and a packaging overcoat for encapsulating the cell assembly, thrust plates and the mounting gasket, each of the thrust plates having an effective thrusting area which is equivalent to or smaller than an effective area of the current collector.

In accordance with the present invention, the configuration of the thrust plates affords excellent device characteristics to the EDLC such as an excellent ESR characteristic.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings, wherein similar constituent elements are designated by similar reference numerals.

Figure 2A:
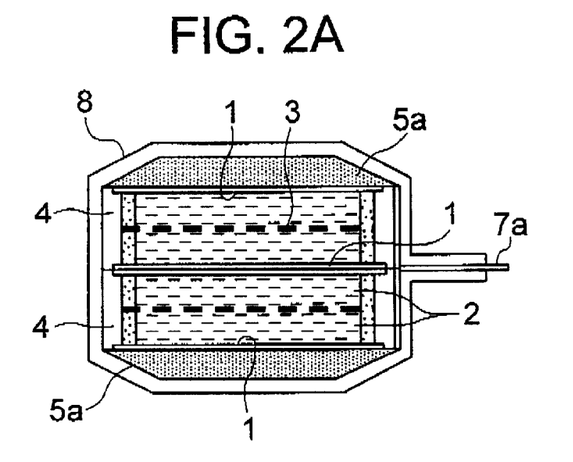
FIGS. 2A to 2C are a sectional view, a top plan view and a sectional view, respectively, of an EDLC according to an embodiment of the present invention, FIGS. 2A and 2C being taken along lines A–A' and C–C' shown in FIG. 2B.
Figure 2B:
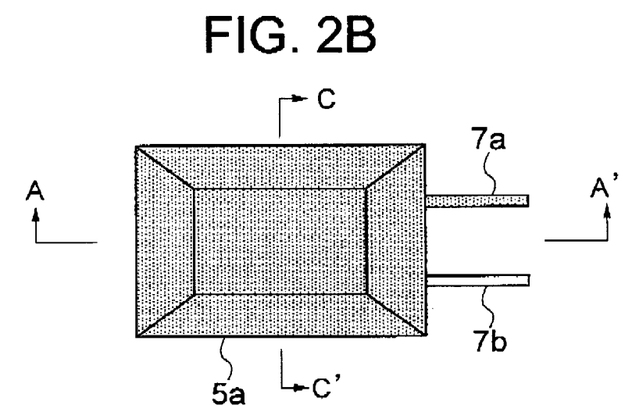
Figure 2C:
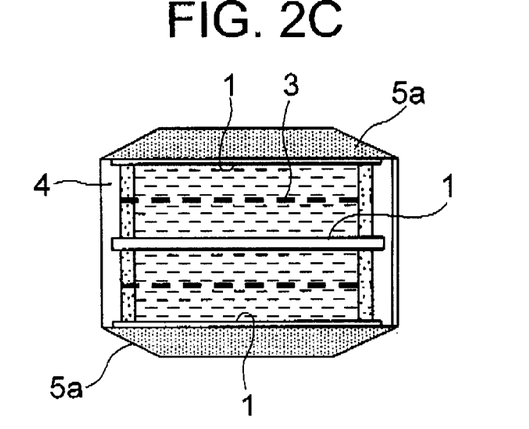

Referring to FIGS. 2A to 2C, an EDLC according to a first embodiment of the present invention includes a pair of unit cells to form a cell assembly, wherein each unit cell has an en block stacked structure including consecutively a current collector 1, a polarizing electrode 2, a porous separator 3, a polarizing electrode 2 and a current collector 1, which are received in a cylindrical mounting gasket 4. These unit cells are stacked one on another to form a stacked cell pair, with one of the current collectors 1 of one the unit cells being in contact with one of the current collectors 1 of the other of the unit cells. A pair of thrust plates 5a are provided on both bottom and top surfaces of the stacked cell pair. The thrust plate 5a has a top flat surface and four slanted side surfaces which are in contact with a packaging overcoat 8, and a bottom flat surface which is in contact with the current collector of the stacked cell pair.

Figure 3A:
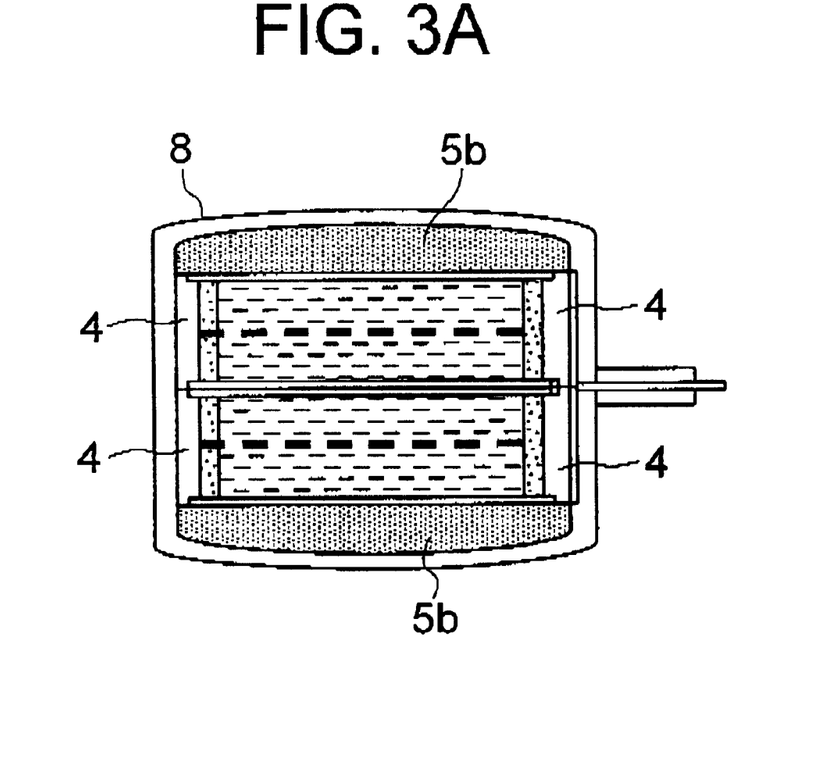
FIGS. 3A and 3B are a sectional view and a top plan view of an EDLC according to another embodiment of the present invention.
Figure 3B:
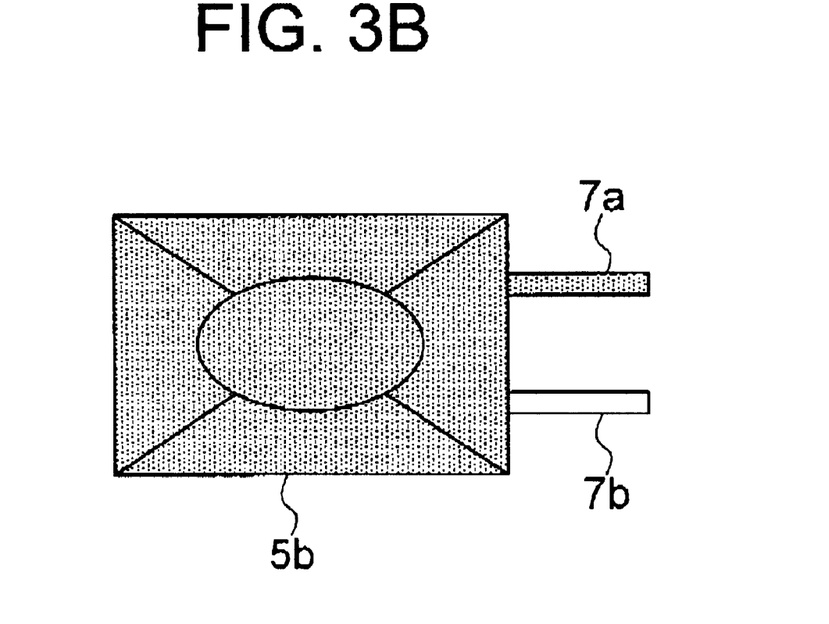

Referring to FIG. 3A and 3B, an EDLC according to a second embodiment of the present invention is similar to the first embodiment except for the structure of the thrust plates, which are designated by 5b in the second embodiment and have a round slanted surface.

Figure 4A:
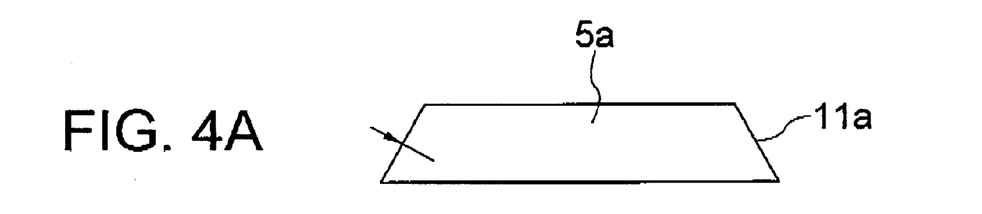
FIGS. 4A to 4C are side views of the thrust plates.

The thrust plate 5a in the first embodiment is shown in FIG. 4A, having a shape similar to a base portion of a pyramid, i.e., a central top flat surface and a four skirt portions 11a each of a slanted plane.

The thrust plate 5b in the second embodiment is shown in FIG. 3B, and is similar to the thrust plate of FIG. 3A except for the slanted surfaces each having a curvature or round surface 11b which is convex toward the outside of the EDLC. The thrust plates 5b sandwich therebetween the stacked cell pair and are thrust by an external force to stack the unit cells together in a close contact during fabrication of the EDLC.

Figure 4B:
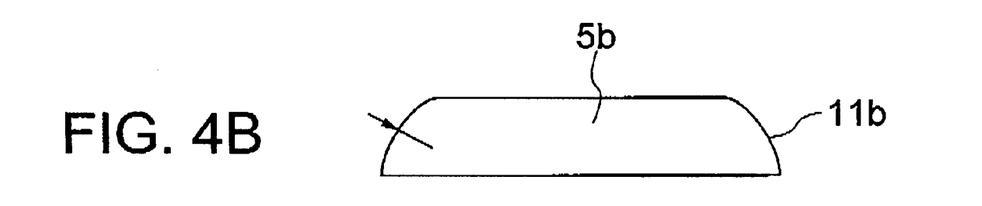
Figure 4C:
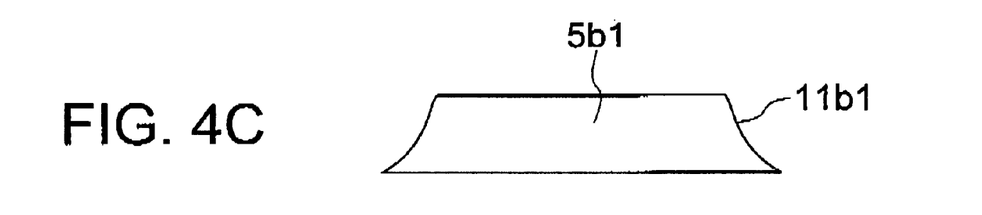

The stacked cell pair is encapsulated in a packaging overcoat 8 by a thrust pressure under the vacuum ambient. The slanted surface 11a or 11b of the thrust plate 5a or 5b shown in FIGS. 4A or 4B allows the stacked cell pair to be uniformly thrust by the thrust pressure under the vacuum packaging ambient. The slanted surface may be a concave surface 11b1 which is concave from the outside, as shown in FIG. 4C. In these configurations of the slanted surfaces, a uniform close contact can be achieved between the unit cells in the stacked cell pair and between the current collector and the thrust plate. A stable ESR characteristic can be achieved by the close contact by the thrust plates.

In addition, the top flat surface of the thrust plate 5a or 5b allows the resultant EDLC to be placed on a working table in a stable posture during handling of the EDLC.

Figure 5A:
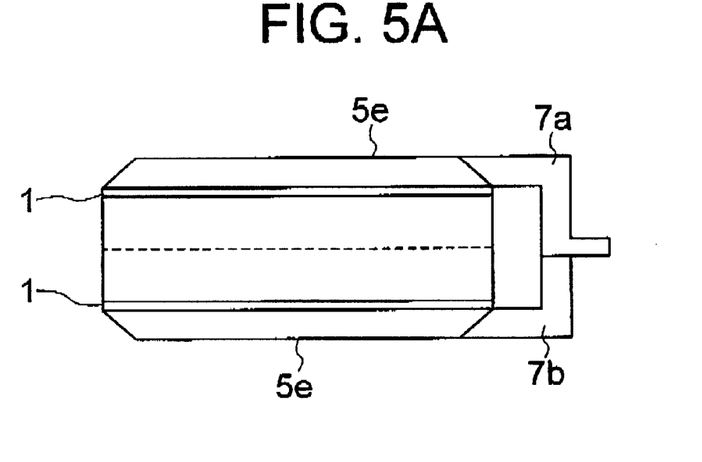
FIGS. 5A to 5C are side views of the structure of the thrust plates and the lead terminals.

Each of the thrust plates 5a is connected to a lead terminal 7a or 7b as shown in FIG. 2B. In an alternative, as shown in FIG. 5A, the thrust plate 5e may have an en bloc lead terminal 7a or 7b. The thickness of the lead terminal7a or 7b shown in FIG. 5A is equivalent to the thickness of the thrust plate 5e due to the en bloc configuration.

Figure 5B:
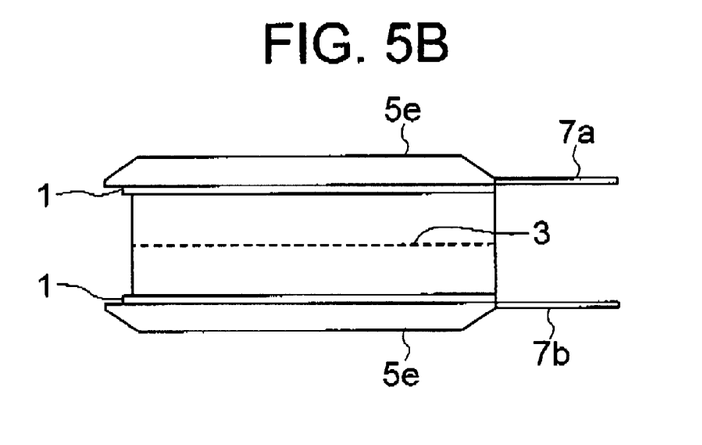
Figure 5C:
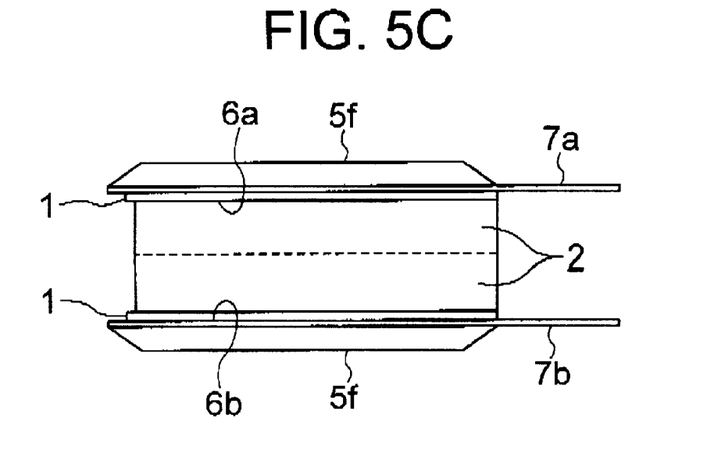

In another configuration shown in FIG. 5B, the lead terminal 7a or 7b has a thickness smaller than the thickness of the thrust plate 5e. In a further alternative, as shown in FIG. 5C, the lead terminal 7a or 7b has a terminal plate section 6a sandwiched between the thrust plate 5f and the current collector 1 of the stacked cell pair. In this configuration, the thrust plate 5f may be made of an insulator such as ceramics.

Figure 6A:
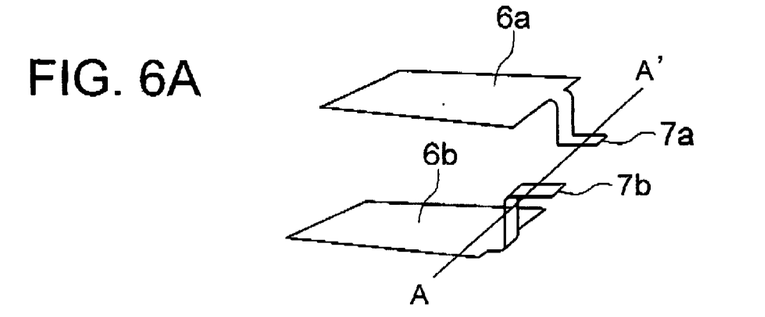
FIGS. 6A to 6E are detailed side or perspective views each showing the detail of the structure of the lead terminals or thrust plates.
Figure 6B:
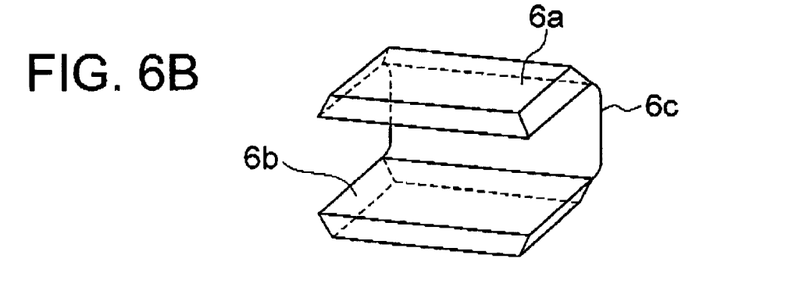
Figure 6C:
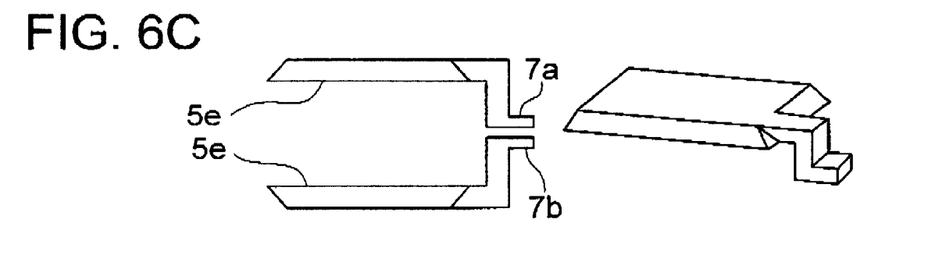

The insulator thrust plates, such as shown in FIG. 5C, may be formed as a thrust member assembly, as shown in FIG. 6B, which has a bridge 6c for coupling the pair of thrust plates 6a and 6b at one side of the stacked cell pair. The thrust member assembly allows the stacked cell pair to be sandwiched between the thrust plates 6a and 6b with ease and at a stable posture.

Referring to FIG. 6A, the terminal plate 6a or 6b, such as shown in FIG. 5C, has an en bloc lead terminal 7a or 7b having bends. The lead terminals 7a and 7b extend from the respective terminal plates 6a and 6b from the same side of the stacked cell pair toward outside the gasket and then bent twice toward the center of the stacked cell pair to form a common plane, as designated by A–A' in FIG. 6A. The common plane of the lead terminals 7a and 7b allows the overcoat package to be sealed with ease.

The chamfer of bend of the lead terminal should be preferably such that a small space is disposed between the edge of the gasket and the bend of the lead terminal, in order to avoid a short circuit failure between the current collector and the lead terminal or the lead terminal and the opposite terminal plate.

Figures 6D, 6E:
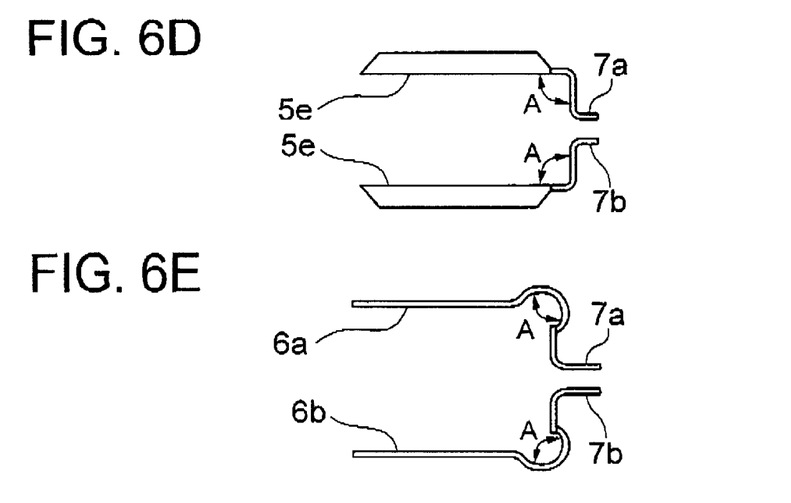

The chamfer of the bend of the lead terminal 7a or 7b is such that the inner corner angle A of the bend, as shown in FIGS. 6D or 6E, is preferably equal to or above 90 degrees. This improves the ESR characteristic of the resultant EDLC. In FIG. 6E, the chamfer angle A of the lead terminal 7a or 7b is shown as somewhat exaggerated.

The inner corner angle A of the bend which is above 90 degrees prevents the lead terminal 7a or 7b from contacting the current collector 1 exposed from the edge of the mounting gasket, thereby avoiding a short circuit failure and a resultant degradation of the device reliability.

Figure 7A:
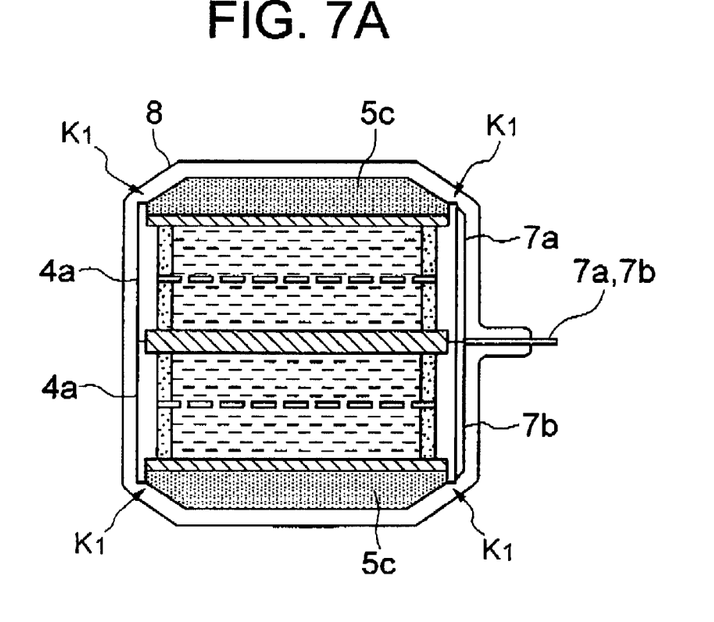
FIGS. 7A and 7B are sectional views of EDLCs according to other embodiments of the present invention.

Referring to FIG. 7A, inner edge of the mounting gasket 4a is chamfered or cut out for allowing the L-shaped edge of the mounting gasket to receive the outer lower edge of the thrust plate in the cutout, as indicated by symbol K1. Thus, the outer edge of the thrust plate 5c and the inner edge of the mounting gasket 4a are interdigitated or engaged together.

The interdigitaion or engagement at the cutout allows a correct positioning between the mounting gasket 4a and the thrust plate 5c. This allows a stable thrusting operation to be applied, which then allows a correct alignment between the layers of the stacked cell pair to prevent deviation in alignment therebetween, and improves the ESR characteristic of the resultant EDLC. Thus, split or break of the electrode plates or current collectors due to the deviation of the thrust plate with respect to the electrodes or collectors can be avoided. In addition, the resultant prevention of the short circuit failure allows a stable operation of the resultant EDLC.

Figure 8:
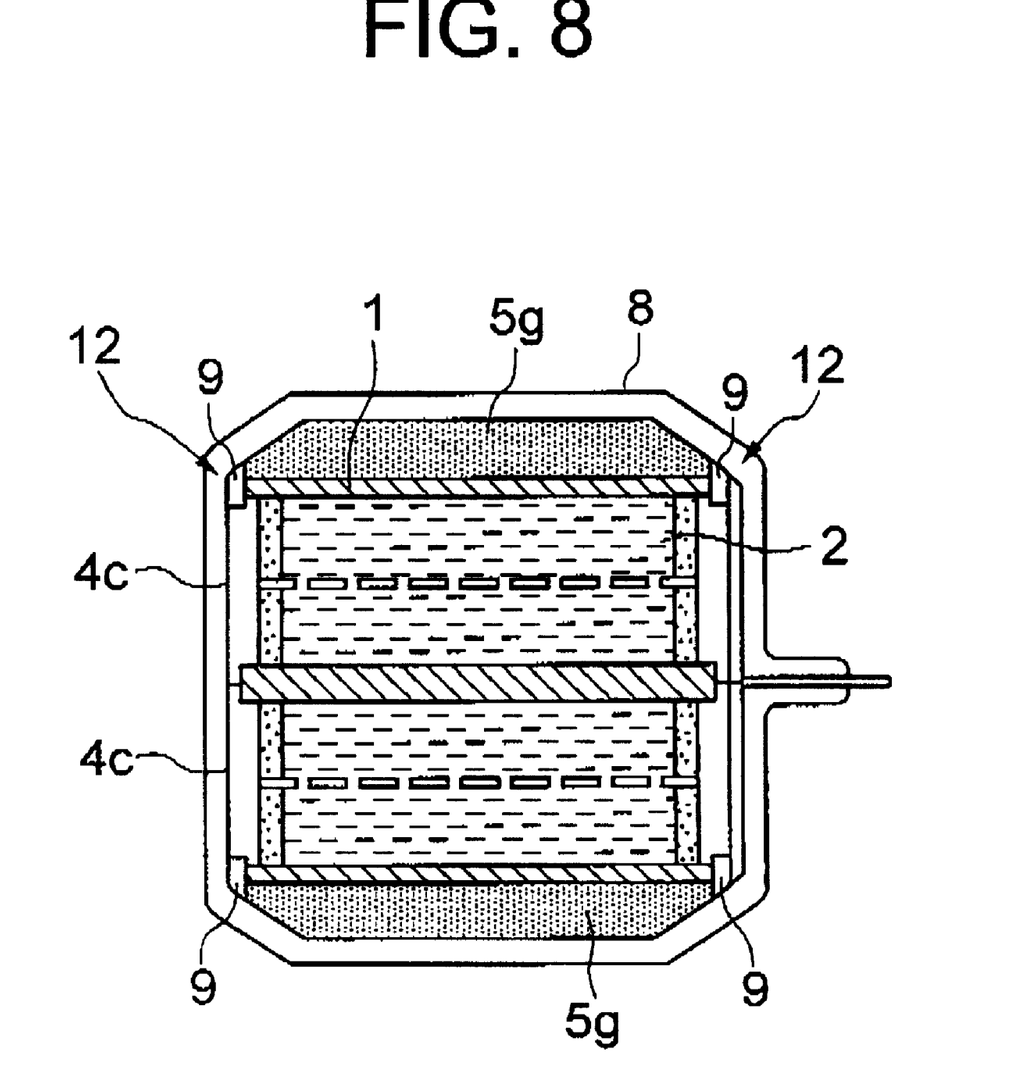
FIG. 8 is a sectional view of an EDLC according to another embodiment of the present invention.

The mounting gasket 4c may have a chamfer or round corner 12 at the outer corner edge thereof, as shown in FIG.

Figure 7B:
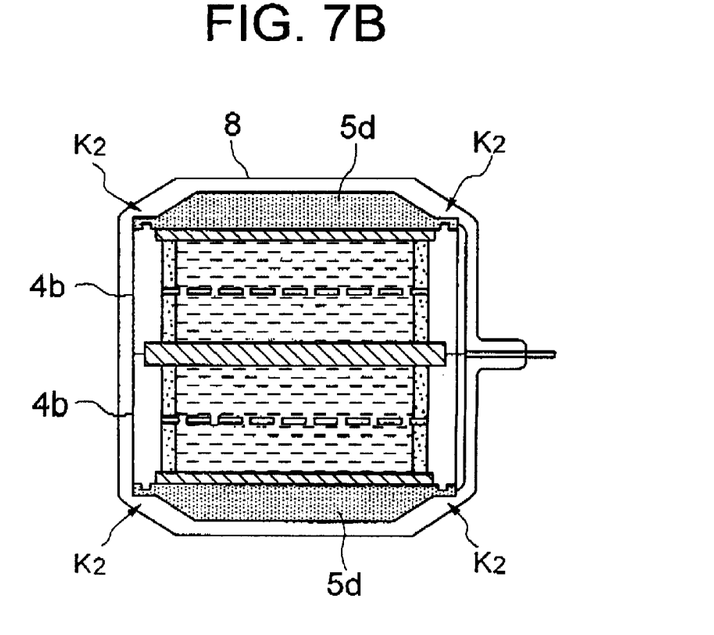

8, at the location where the mounting gasket contacts 4c with the packaging overcoat 8. This prevents the crack or split of the packaging overcoat 8, especially in the case of the packaging overcoat 8 made of a film In an alternative, as shown in FIG. 7B, the edge of the mounting gasket 4b has a stripe protrusion which is received in a stripe groove formed in the vicinity of the edge of the thrusting plate 5d for the interdigitation between the mounting gasket 4b and the thrusting plate 5d.

As shown in FIG. 8, the mounting gasket 4c may have a plurality of positioning gaskets 9 received in a plurality of cutouts of the outer edge of the mounting gasket 4c. This effectively prevents deviation of the mounting plate 5g with respect to the layers of the stacked cell pair.

The positioning gasket 9 has preferably a thickness equivalent to or less than the thickness of the thrusting plate 5g. This allows the thrusting plate 5g to provide a uniform thrusting force to the stacked cell pair.

The area of the thrusting plate 5 in contact with the stacked cell pair for thrusting the same is preferably equivalent to or larger than the area of the polarizing electrode 2. This prevents breakage of the current collector 1 and thus resultant leakage of the electrolytic solution, and split or breakage of the polarizing electrodes 2.

Figure 4D:
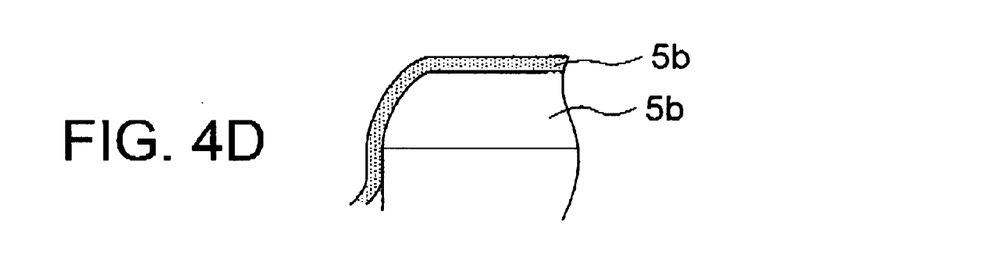
FIGS. 4D and 4E are detailed sectional views of the vicinities of the slanted surfaces of the thrust plates.
Figure 4E:
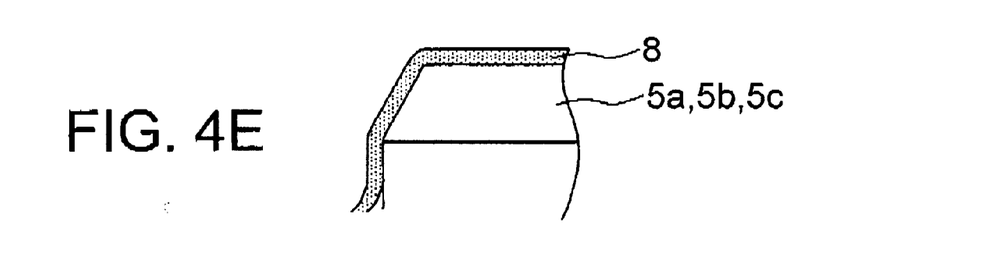

Referring to FIGS. 4D and 4E, the packaging overcoat 8 is in a close contact with the outer slanted surface of the thrusting plate 5b, 5a, 5c or 5d, irrespective of the slanted surface being a round surface (FIG. 4D) or a planar surface (FIG. 4E) and the packaging overcoat 8 being a resin package or a film package.

The packaging overcoat 8 may be a laminated film including an aluminum core layer and a pair of resin layers sandwiching the same therebetween especially in the case of a vacuum packaging operation.

The resin layer for the laminated film may be a polyolefine-based film such as made of polyethylene or polypropylene, a polyamide-based film, a polyester-based film such as made of polyethylene terephthalate, or may be combination of these films.

Figure 9A:
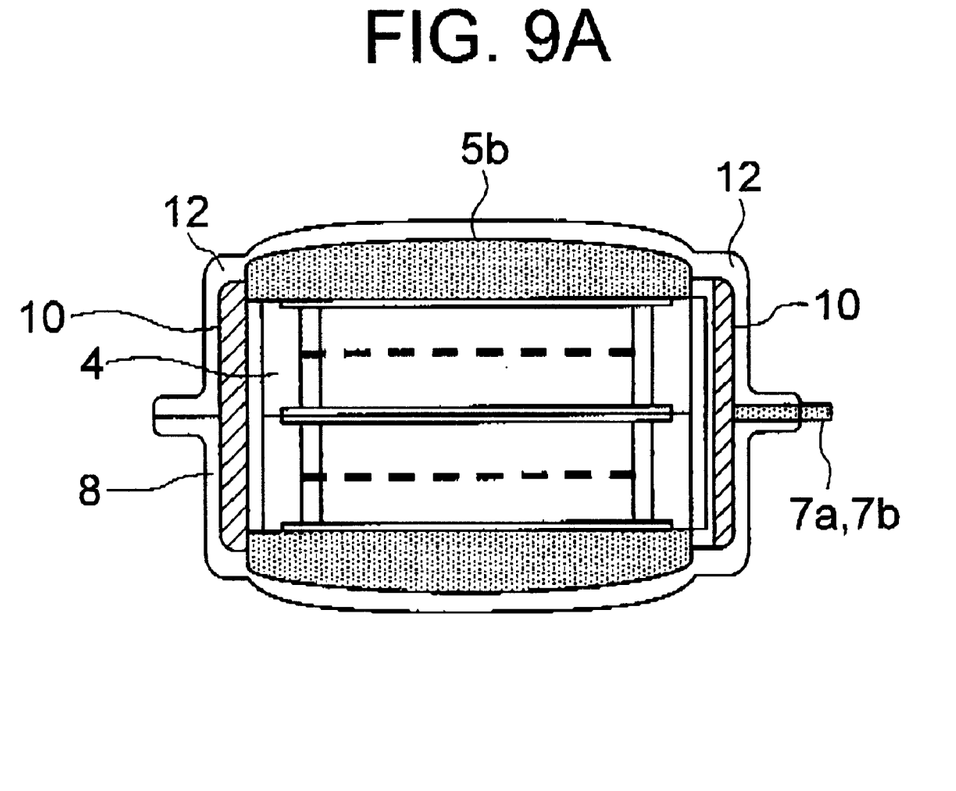
FIGS. 9A and 9B are a sectional view and a top plan view, respectively, of an EDLC according to another embodiment of the present invention.
Figure 9B:
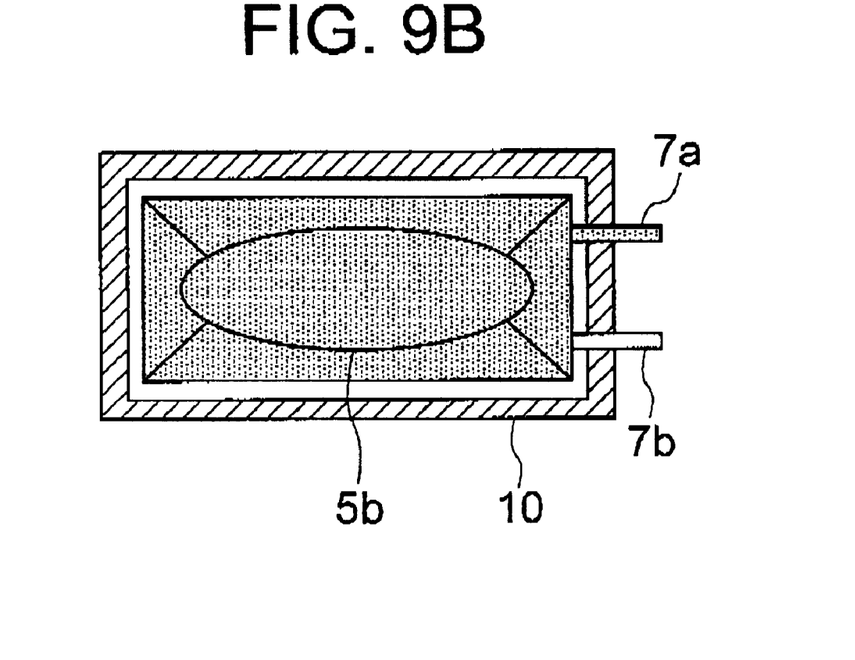

The EDLC may have a frame member 10 made of soft resin or elastic rubber between the mounting gasket 4 and the packaging overcoat 8 for encircling the stacked cell pair, as shown in FIG. 9A. The frame member 10 assist the mounting gasket 4 in support of the stacked cell pair with respect to the packaging overcoat 8. The frame member 10 has preferably an outer edge which is chamfered to have a round edge 12. This configuration allows prevention of deviation of the stacked cell pair and damage of the packaging overcoat 8 during the vacuum packaging operation, and also functions as a buffer member against an external impact.

The frame member 10 may be made of synthetic rubber elastomer such as polystyrene-based thermoplastic elastomer, polyolefine-based thermoplastic elastomer, polydiene-based thermoplastic elastomer, chlorine-based thermoplastic elastomer, and engineering plastic thermoplastic elastomer The current collector, electrolytic solution, polarizing electrode, porous separator and gasket member may be made of other materials other than the materials as exemplified herein.

The current collector may be made of rectangular rubber or plastic sheet obtained by kneading conductive carbon powder with butyl rubber or plastic, or made of a metallic foil. The electrolytic solution may be a diluted sulfuric acid aqueous solution, or may be a non-aqueous electrolytic solution wherein tetraethylammonium tetrafluoroborate etc. is solved in a non-aqueous polarizing solvent such as propylene carbonate, diethyl carbonate, ethyl carbonate, and ethyl-methyl carbonate.

The polarizing electrode may be preferably an active carbon sheet or an active carbon block wherein active carbon powder is shaped by a binder such as a phenol resin binder, followed by sintering thereof. The porous separator may be preferably made of a woven cloth or an unwoven cloth made of glass fibers, or a porous resin film made of polypropylene polytetrafluoroethylene (PTFE), polyvinilydine fluoride (PVDF). The gasket may be preferably made of a heat-resisting ABS resin or insulating butyl rubber sheet.

EXAMPLES

Samples of the EDLC according to the above embodiments were fabricated, and subjected to tests in comparison with modifications therefrom or comparative examples, the tests including measurement of ESR, self discharge (SD) characteristics in the initial stage after fabrication and a subsequent reliability test including MTTF.

The self discharge (SD) test was measured, after applying 8 volts for 24 hours at a room temperature, by measuring the voltage ratio of the residual voltage at 24 hours after the stop of the voltage application with respect to the initial voltage directly after the stop of the voltage application. The residual voltage ratio is expressed in terms of percents thereof.

The ESR characteristic is obtained as the real part of the impedance measured by an alternate-current-four-terminal method using a test signal having a frequency of 1 kHz.

The mean time to failure (MTTF) in the reliability test is measured by 1000 hours of application of 8 volts at a high temperature of 70° C. The MTTF is obtained by measuring the time lengths of the samples between the start of the test and the time instant at which the samples exhibited failures, plotting the time lengths on Wible probability sheet and estimating the level of MTTF thus obtained for the samples, with the MTTF of Embodiment #1 being set at a unit.

The number of samples was 50 for each level, and the MTTF of these samples were averaged. Each sample had a stacked cell structure having 10 serial unit cells in the stacked cell structure.

The sample of Embodiment #1 had a pair of 0.3-mm-thick thrust plates each having a lead terminal. The effecting area of the thrust plate is equivalent to the contact area of the stacked cells, and the chamfer angle A shown in FIG. 6E was 90 degrees The samples of modifications #1 modified from Embodiment #1 had chamfer angles A of 60, 75, 105 and 135 degrees. In addition, samples of modifications #2 modified from Embodiment #1 had chamfer angles A of 75, 90, 105 and 135 degrees. The samples having a chamfer angle of 60 or 75 degrees were comparative examples.

Each of two samples of Embodiments #2 had a pair of thick thrust plates each having a lead terminal. The effecting area of the thrust plate is equivalent to the contact area of the stacked cells, and the slanted surface of the thrust plate was a round surface 11b, as shown in FIG. 4B, having a radius of curvature of 0.05 or 0.1 mm. The samples of modifications #3 modified from Embodiment #2 had slanted planes 11a, such as shown in FIG. 4A. The chamfer of the edge in modification had 0.05 or 0.1 mm.

Each sample of Embodiment #3 had a frame member 10, such as shown in FIG. 9A, which has a height "L" wherein L>B. L=B or L<B, given B being the thickness of the stacked cells.

The sample of Modification #4 modified from Embodiment #3 had a height "L" wherein L=B, with the chamfer of the edge of the frame member having a radius of curvature of 0.1 mm.

The sample of Embodiment #4 had a positioning gasket 9, such as shown in FIG. 8, wherein the thickness of the gasket 9 is smaller than the thickness of the thrusting plate.

The results of the measurements are shown in Table 1.

TABLE 1

|  | LEVEL | ESR | SD | RTTF | CF |
|---|---|---|---|---|---|
| EMBODIMENT #1 | A-90° | 1 | 1 | 1 | INVENTION |
| MODIFICATION #1 | A-60° | 4.0 | 0.75 | 0.57 | COMPARATIVE EXAMPLE |
| MODIFICATION #1 | A-75° | 2.5 | 0.80 | 0.73 | COMPARATIVE EXAMPLE |
| MODIFICATION #1 | A-105° | 0.95 | 1.2 | 1.23 | INVENTION |
| MODIFICATION #1 | A-135° | 0.94 | 1.34 | 1.53 | INVENTION |
| MODIFICATION #2 | A-75° | 1.7 | 0.9 | 0.92 | COMPARATIVE EXAMPLE |
| MODIFICATION #2 | A-90° | 0.96 | 1.2 | 1.31 | INVENTION |
| MODIFICATION #2 | A-105° | 0.88 | 1.3 | 2.1 | INVENTION |
| MODIFICATION #2 | A-135° | 0.85 | 1.35 | 2.38 | INVENTION |
| EMBODIMENT #2 | R-0.05 | 0.88 | 1.2 | 1.9 | INVENTION |
| EMBODIMENT #2 | R-0.1 | 0.82 | 1.3 | 2.4 | INVENTION |
| MODIFICATION #3 | C-0.05 | 0.89 | 1.35 | 1.7 | INVENTION |
| MODIFICATION #3 | C-0.1 | 0.81 | 1.23 | 2.3 | INVENTION |
| MODIFICATION #3 | L < B | 0.92 | 1.1 | 1.63 | INVENTION |
| MODIFICATION #3 | L = B | 0.98 | 0.98 | 1.32 | INVENTION |
| MODIFICATION #3 | L > B | 3.9 | 0.97 | 0.39 | INVENTION |
| MODIFICATION #4 | L = B | 0.95 | 0.98 | 2.04 | INVENTION |
| EMBODIMENT #4 |  | 1.03 | 1.07 | 1.53 | INVENTION |

As understood from Table 1, the samples of Embodiments and modifications therefrom had excellent characteristics compared to the conventional EDLC. More specifically, samples of the present invention having slanted plane or slanted round surface, having the area of the thrust plate which is smaller of the area of the current collector, the chamfered angle of the lead terminal which is equal to or larger than 90 degrees, or the specific structure of the mounting gasket achieved excellent ESR and SD characteristics.

Since the above embodiments are described only for examples, the present invention is not limited to the above embodiments and various modifications or alterations can be easily made therefrom by those skilled in the art without departing from the scope of the present invention.

What is claimed is:

1. An electric double-layer capacitor (EDLC) comprising:
   a cell assembly including at least one unit cell having a pair of polarizing electrodes impregnated with electrolytic solution, a porous separator sandwiched between said polarizing electrodes, a pair of current collectors sandwiching therebetween said unit cell, and a pair of lead terminals in electric contact with said current collectors;
   a pair of thrust plates each disposed on a corresponding one of said current collectors for thrusting therebetween said cell assembly;
   a mounting gasket for receiving said cell assembly together with said thrust plates; and
   a packaging overcoat for encapsulating said cell assembly, said thrust plates and said mounting gasket, wherein said packaging overcoat provides a thrusting force to said thrust plates when sealed by a vacuum and each of said thrust plates has slanted side surfaces in contact with said packaging overcoat.

2. The EDLC as defined in claim 1, wherein each of said pair of lead terminals extends from a corresponding one of said thrust plates and is made of a conductive material.

3. The EDLC as defined in claim 2, wherein each of said lead terminals has a terminal plate section sandwiched between one of said thrust plates and a corresponding one of said current collectors.

4. The EDLC as defined in claim 3, wherein said thrust plates are made of an insulator and coupled to one another by a bridge.

5. The EDLC as defined in claim 1, wherein an edge of said mounting gasket is cut out to form an L-shape that receives an edge of one of said thrust plates.

6. An EDLC, comprising:
   a cell assembly including at least one unit cell having a pair of polarizing electrodes impregnated with electrolytic solution, a porous separator sandwiched between said polarizing electrodes, a pair of current collectors sandwiching therebetween said unit cell, and a pair of lead terminals in electric contact with said current collectors;
   a pair of thrust plates each disposed on a corresponding one of said current collectors for thrusting therebetween said cell assembly;
   a mounting gasket for receiving said cell assembly together with said thrust plates, wherein an edge of said mounting gasket has a stripe protrusion that is received in a groove formed near an edge of one of said thrust plates; and
   a packaging overcoat for encapsulating said cell assembly, said thrust plates and said mounting gasket, wherein said packaging overcoat provides a thrusting force to said thrust plates when sealed by a vacuum and each of said thrust plates has slanted side surfaces in contact with said packaging overcoat.

7. The EDLC as defined in claim in claim 5, wherein a portion of the edge of said mounting gasket in contact with said packaging overcoat is chamfered to have a round surface.

8. The EDLC as defined in claim 5, wherein the edge of said mounting gasket has at lest two protrusions and the edge of said thrust plate has at least tow depressions corresponding to said protrusions.

9. The EDLC as defined in claim 1, wherein said mounting gasket has a thickness equal to or smaller than a thickness of each of said thrust plates.

10. An EDLC, comprising:
    a cell assembly including at least one unit cell having a pair of polarizing electrodes impregnated with electrolytic solution, a porous separator sandwiched between said polarizing electrodes, a pair of current collectors sandwiching therebetween said unit cell, and a pair of lead terminals in electric contact with said current collectors;
    a pair of thrust plates each disposed on a corresponding one of said current collectors for thrusting therebetween said cell assembly;
    a mounting gasket for receiving said cell assembly together with said thrust plates; and
    a packaging overcoat for encapsulating said cell assembly, said thrust plates and said mounting gasket, wherein said packaging overcoat provides a thrusting force to said thrust plates when sealed by a vacuum, each of said thrust plates has slanted side surfaces in contact with said packaging overcoat and said slanted side surfaces of said thrust plates are at least one of convex toward said packaging overcoat, convex toward said cell assembly, and a planar surface.

11. An EDLC, comprising:

a cell assembly including at least one unit cell having a pair of polarizing electrodes impregnated with electrolytic solution, a porous separator sandwiched between said polarizing electrodes, a pair of current collectors sandwiching therebetween said unit cell, and a pair of lead terminals in electric contact with said current collectors;

a pair of thrust plates each disposed on a corresponding one of said current collectors for thrusting therebetween said cell assembly, wherein each of said pair of thrust plates has an area which is equivalent to or smaller than an area of said corresponding one of said current collectors;

a mounting gasket for receiving said cell assembly together with said thrust plates; and a packaging overcoat for encapsulating said cell assembly, said thrust plates and said mounting gasket, wherein said packaging overcoat provides a thrusting force to said thrust plates when sealed by a vacuum, each of said thrust plates has slanted side surfaces in contact with said packaging overcoat and each of said thrust plates has an area which is equivalent to or smaller than an area of said corresponding one of said current collectors.

12. An electric double-layer capacitor (EDLC) comprising:

a cell assembly including at least one unit cell having a pair of polarizing electrodes impregnated with electrolytic solution, and a porous separator sandwiched between said polarizing electrodes, a pair of current collectors sandwiching therebetween said unit cell, and a pair of lead terminals in electric contact with said current collectors;

a pair of thrust plates each disposed on a corresponding one of said current collectors for thrusting therebetween said cell assembly;

a mounting gasket for receiving said cell assembly together, with said thrust plates; and a packaging overcoat for encapsulating said cell assembly, said thrust plates and said mounting gasket, wherein said packaging overcoat provides a thrusting force to said thrust plates when sealed by a vacuum and each of said thrust plates has an area of contact with said corresponding one of said current collectors equal to or smaller than an area of said corresponding one of said current collectors.

13. The EDLC as defined in claim 12, wherein an edge of said mounting gasket is cut out to form an L-shape that receives an edge of one of said thrust plates.

14. The EDLC as defined in claim 12, wherein each of said lead terminals has a terminal plate section sandwiched between one of said thrust plates and a corresponding one of said current collectors.

15. The EDLC as defined in claim 14, wherein said pair of thrust plates are made of an insulator and coupled to one another by a bridge.

16. The EDLC as defined in claim 12, wherein each one of said thrust plates has substantially a shape of a base portion of a pyramid.

17. The EDLC as defined in claim 1, wherein each of said lead terminals bends toward a side of said cell assembly at a bend and then bends away from said cell assembly at another bend, that portion of each said lead terminal extending from said another bend being disposed in a common plane.

18. The EDLC as defined in claim 17, wherein each of said bends has an angle equal to 90 degrees or more.

19. An EDLC, comprising:

a cell assembly including at least one unit cell having a pair of polarizing electrodes impregnated with electrolytic solution, a porous separator sandwiched between said polarizing electrodes, a pair of current collectors sandwiching therebetween said unit cell, and a pair of lead terminals in electric contact with said current collectors;

a pair of thrust plates each disposed on a corresponding one of said current collectors for thrusting therebetween said cell assembly;

a mounting gasket for receiving said cell assembly together with said thrust plates;

a packaging overcoat for encapsulating said cell assembly, said thrust plates and said mounting gasket, wherein said packaging overcoat provides a thrusting force to said thrust plates when sealed by a vacuum and each of said thrust plates has slanted side surfaces in contact with said packaging overcoat; and a frame member between said mounting gasket and said packaging overcoat.

20. The EDLC as defined in claim 12, wherein each of said lead terminals bends toward a side of said cell assembly at a bend and then bends away from said cell assembly at another bend, that portion of each said lead terminal extending from said another bend being disposed in a common plane.

21. The EDLC as defined in claim 20, wherein each of said bends has an angle equal to 90 degrees or more.

22. The EDLC as defined in claim 12, further comprising a frame member between said mounting gasket and said packaging overcoat.

23. The EDLC as defined in claim 12, wherein each of said pair of lead terminals extends from a corresponding one of said thrust plates and is made of a conductive material.

* * * * *